US006330459B1

(12) United States Patent
Crichton et al.

(10) Patent No.: US 6,330,459 B1
(45) Date of Patent: Dec. 11, 2001

(54) COMMUNICATION SYSTEM WITH A BEAMFORMED CONTROL CHANNEL AND METHOD OF SYSTEM CONTROL

(75) Inventors: Paul Crichton, Newbury; Paul Howard, Bristol; Nicholas Anderson, Leyand; William Robinson, Farnham, all of (GB)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/254,671

(22) PCT Filed: Aug. 11, 1997

(86) PCT No.: PCT/EP97/04417

§ 371 Date: Mar. 12, 1999

§ 102(e) Date: Mar. 12, 1999

(87) PCT Pub. No.: WO98/14024

PCT Pub. Date: Apr. 2, 1998

(30) Foreign Application Priority Data

Sep. 25, 1996 (GB) .................................................. 9619975

(51) Int. Cl.[7] ...................................................... H04Q 7/20
(52) U.S. Cl. ............................ 455/562; 455/434; 455/436
(58) Field of Search .................................. 455/434, 436, 455/439, 443, 444, 450, 452, 560, 561, 562, 423, 435, 512, 513, 13.4, 68, 69, 522, 449, 464, 13.3, 509, 511, 524, 525, 515; 370/331, 332, 334, 341

(56) References Cited

U.S. PATENT DOCUMENTS

| 5,203,010 | * | 4/1993 | Felix et al. | 455/438 |
| 5,487,174 | * | 1/1996 | Persson | 455/33.2 |
| 5,628,052 | * | 5/1997 | DeSantis et al. | 455/562 |
| 5,649,293 | * | 7/1997 | Reed | 69/19.2 |
| 5,710,982 | * | 1/1998 | Laborde et al. | 455/69 |
| 5,887,261 | * | 3/1999 | Csapo et al. | 455/450 |
| 5,907,809 | * | 5/1999 | Molnar et al. | 455/456 |
| 5,907,816 | * | 5/1999 | Newman et al. | 455/562 |
| 5,960,350 | * | 9/1999 | Schorman et al. | 455/450 |
| 6,091,788 | * | 7/2000 | Keskitalo et al. | 375/347 |
| 6,131,034 | * | 10/2000 | McLaughlin et al. | 455/450 |

\* cited by examiner

*Primary Examiner*—Dwayne Bost
*Assistant Examiner*—Jean A Gelin (57) ABSTRACT

To reduce interference in a communication system (10), a communication unit (42–50) is arranged to initiate establishment of a radio frequency communication with a base station (26–38) by transmitting a system access request on a dedicated, wide area control channel. Upon receipt of the system access request, a base station (32) of the communication system of FIG. 1 responds by forming a narrowbeam control channel to the communication unit and transmitting system control information to the communication unit on the narrowbeam control channel, the system control information transmitted from the array of antenna elements and arranged to identify a narrowbeam communication resource for use in the radio communication. The communication unit (42–50), upon receiving the system control information, then configures itself to utilise the narrowbeam communication resource for the radio communication.

9 Claims, 5 Drawing Sheets

COMMUNICATION SYSTEM WITH A BEAMFORMED CONTROL CHANNEL AND METHOD OF SYSTEM CONTROL

BACKGROUND OF THE INVENTION

This invention relates, in general, to a communication system with a beamformed control channel and particularly to a method of system control in a communication system having an adaptive antenna array.

SUMMARY OF THE PRIOR ART

Cellular communication systems, generally, are comprised of many adjacent "cells" each administered by a base station controller. Usually, each base station controller will control a number of base transceiver stations responsible for administering individual sectors within each cell. Mobile units affiliated to a particular system (which could be a time or frequency division system) are free to move between cells and are in controlled communication with, principally, only one base transceiver station at any one instance in time, and each mobile unit is thus subject to a hand-off mechanism between base transceiver stations (and occasionally base station controllers) in adjacent sectors (or cells, respectively) when the mobile unit transitions a nominal boundary between adjacent sectors or cells. Typically, this nominal boundary is predefined in terms of either an acceptable level for received signal strength or a point in time when a bit error rate (BER) for the communication becomes unacceptable.

In terms of system administration and particularly the control of mobile units, for example, each base station controller continuously transits an omni-directional broadcast control channel (termed a BCCH) at full transmit power, which BCCH supports control data for the mobile units. For example, the BCCH is encoded with channel information that instructs a selectively identified mobile unit to utilise a particular channel frequency (and sometimes a particular channel timeslot) for a communication. Additionally, nearest neighbour BCCHs covering adjacent sectors or cells are typically monitored by the mobile units in a serving coverage area to determine whether a handoff is necessary (because, for example, a signal strength of a BCCH of a serving cell is significantly inferior to a signal strength of a BCCH of an adjacent cell). Usually, mobile units request, for example, a service by using a dedicated Random Access Control Channel (RACH) on an assigned return (up-link) BCCH channel resource, typically time-slot zero in a time division multiplexed (TDM) system such as the Global System for Mobile (GSM) communication. Furthermore, all mobile units in a particular coverage area have access to this RACH all the time, and so contentions may arise in the event that two mobiles simultaneously attempt to transmit on the RACH. Specifically, a base station controller (or a base transceiver station) is unable to resolve these simultaneous transmissions, and is therefore unable to isolate and is hence unable to attend to a specific request from a particular mobile. Consequently, a handshake with either of the mobile units is not initiated by the base station controller (or the base transceiver station) within a predetermined time, and both mobile units default and temporarily abort their respective access attempts. Then, after differing pseudo-random delays, each mobile unit again attempts to establish contact with the base station controller (or the base transceiver station), with the pseudo-random delay providing a mechanism for resolving the mobile units by dispersing in tame individual RACH access attempts. As will be understood, the message transmitted by each mobile unit on the RACH may take the form of a randomly generated data word (having a length of, say, 8 bits), while the base station controller (or the base transceiver station) may identify the corresponding mobile unit by simply re-transmitting this data word.

The present requirement that systems exhibit a constant BCCH currently inhibits the use of adaptive beamforming techniques, and hence maintains the requirement for careful BCCH re-use planning to prevent detrimental levels of interference occurring between control channels. Therefore, downlink beamforming from an adaptive array of antenna elements co-located with each base site controller is currently restricted to systems that physically, differentiate traffic channels (TCHs) and BCCH frequencies and functions. Indeed, since beamforming is currently limited to TCHs, communication systems are not frequency optimised.

SUMMARY OF THE INVENTION

In a first aspect of the present invention there is provided a method of establishing radio communication between a communication unit and a base station having an array of antenna elements, the method comprising the steps of: a) at the communication unit, sending a system access request on a dedicated wide area control channel; b) at the base station, receiving the system access request and, in response thereto, forming a first narrowbeam control channel to the communication unit and transmitting system control information to the communication unit on the first narrowbeam control channel, the system control information transmitted from the array of antenna elements and arranged to identify a narrowbeam communication resource for use in the radio communication; and c) at the communication unit, receiving the system control information and configuring the communication unit to utilise the narrowbeam communication resource for the radio communication In a preferred method, the present invention further includes the steps of: a) receiving the system access request at a plurality of base station; b) at each base station, making signal parameter measurements of the access request to determine a rank order of signal parameter measurements with respect to the plurality of base stations; and c) selecting a base station to serve the communication device from the rank order.

Preferably, the method of the present invention further comprises the steps of: at the communication unit: a) measuring a signal parameter for the first narrowbeam control channel to produce a signal parameter measurement; b) determine whether the signal parameter measurement is above a predetermined threshold deemed sufficient to support the radio communication; and c) when the signal parameter measurement is below the predetermined threshold, transmitting a system configuration request on a second narrowbeam control channel to request re-orientation of the first narrowbeam control channel with respect to the communication unit.

The method of claim of the present invention may also include the steps of: at the communication unit: a) measuring a signal parameter for the first narrowbeam control channel to produce a signal parameter measurement; b) determining whether the signal parameter measurement is above a predetermined threshold deemed sufficient to support the radio communication; and c) when the signal parameter measurement is below the predetermined threshold, transmitting a system configuration request on a second narrowbeam control channel to request assignment of a new narrowbeam control channel from a different one of the plurality of base stations.

The base station may periodically alter a beam pattern of the first narrowbeam control channel, e.g. by oscillating a narrowbeam radiation pattern about an expected position of the communication unit or by adjusting a width of the beam pattern of the first narrowbeam control channel. In the event that the beam pattern is altered, the present invention contemplates that the base station transmits beam pattern information on the first narrowbeam control channel to identify how the beam pattern of the first narrowbeam channel is altered; and, in response to receipt of the beam pattern information at the communication unit, the communication unit correlates the beam pattern information with the signal parameter measurement and transmits to the base station at least one of a resultant correlation measurement and the signal parameter measurement on the second narrowbeam control channel.

According to a second aspect of the present invention there is provided a radio communication system for supporting radio communication between a communication unit and a base station, the radio communication system having a dedicated wide area control channel, wherein: a) the communication unit comprises: i) means for generating and transmitting a system access request on the dedicated wide area control channel for establishing the radio communication; and ii) means for receiving system control information, for configuring the communication unit to utilise a narrowbeam communication resource for the radio communication; and wherein b) the base station comprises: i) an array of antenna elements; ii) means, responsive to the array of antenna elements, for receiving and processing the system access request; iii) means, response to the system access request, for assigning and generating system control information identifying the narrowbeam communication resource for use in the radio communication; and iv) mean, coupled to the array of antenna elements, for forming and transmitting a first narrowbeam control channel to the communication unit.

In another aspect, there is provided a method of modifying a narrowbeam communication resource utilised between a first communication unit and a second communication unit, the method comprising the steps of a) at the first communication unit, transmitting the narrowbeam communication unit at the second communication unit; b) at the second communication unit, receiving the narrowbeam communication resource and measuring a signal parameter relating to reception of the communication resource to generate control information; c) at the second communication unit, sending the control information to the second; and d) at the first unit, receiving the control information and modifying the narrowbeam communication resource in response to the control information.

The present invention therefore advantageously provides a communication system having reduced interference.

Exemplary embodiments of the present invention will now be described with reference to the accompanying drawings.

DETAILED DESCRIPTION OF A PREFERRED EMBODIMENT

Figure 1:
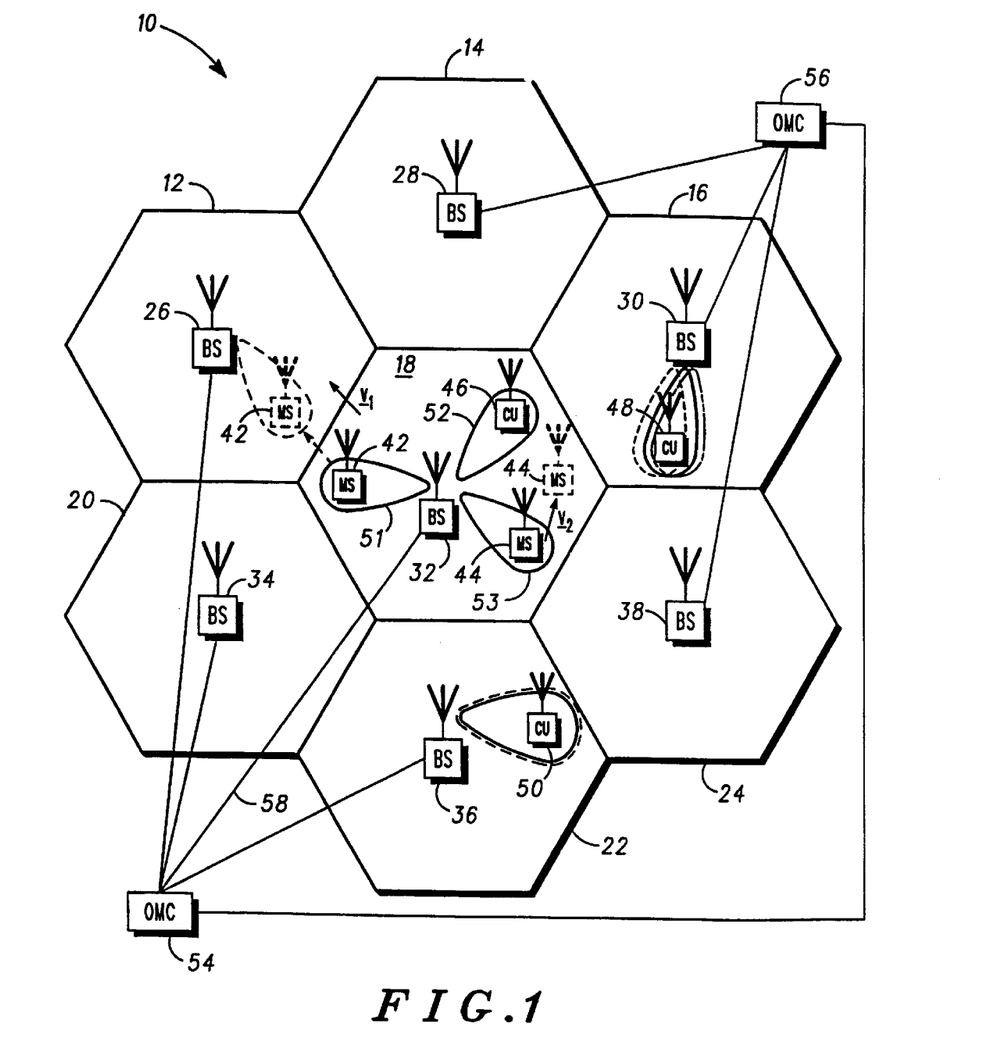
FIG. 1 is a block diagram of a communication system according to a preferred embodiment of the present invention.

Turning to FIG. 1, a block diagram of a communication system 10 according to a preferred embodiment of the present invention is defined by a plurality of adjoining cells 12–24 that are conventionally represented in a hexagonal pattern. Each cell 12–24 contains base station equipment 26–38 that is centrally located to optimise communication coverage in each cell and which equipment includes an adaptive array of antenna elements. In this description, the generic term "base station equipment" will be used to refer to a base station controller, a base transceiver station or an appropriate combination, and is indicative of a communication unit that has control logic capable of supporting and routing calls between both mobile and fixedly located voice or data communication equipment (typically arranged to operate at radio frequencies).

Communication units 42–50, such as mobile telephone and mobile data units 42–44, are dispersed throughout the geographic region of the communication system 10. Mobile communication units 42–44 have the ability to move across boundaries between cells 12–24, although for substantial periods of time these mobile units 42–44 may be fixedly located within a defined local area, such as when a user of a mobile unit is attending a meeting m an office environment. Movement of mobile unit 42 is indicated (in FIG. 1) by a vector $v_1$ that transitions a boundary between cell 18 and cell 12, while mobile unit 44 has associated vector $v_2$ that indicates its movement towards another location within the confines of cell 18.

According to the present invention, communication units 42–50 are controlled by base station equipment 26–38 via a beamformed BCCH transmitted from the array of antenna elements. Furthermore and unlike the prior art, each cell 12–38 does not necessarily possess a BCCH at a particular instance in time, and consequently a particular BCCH is neither capable of being received nor accessed by all communication units 42–50 in a particular cell, nor used by mobile communication units 42–44 for mobile assisted handover between adjacent cells. Consequently, the present invention reduces co-channel and adjacent channel interference caused by conventional, prior art omni-directional BCCHs and alleviates the need (to some extent) of frequency planning and strict BCCH carrier re-use.

As can be seen in FIG. 1, communication units 42–50 are served by narrowbeam, directionally radiated channels. For example, referring to cell 18 in which three communication units 42–46 are actively participating in communications with base station equipment 32, each communication unit 42–46 is served by a narrowbeam BCCH 51–53 emanating from base station equipment 32. As will be understood, each narrowbeam BCCH 51–53 may be located on the same frequency, and even the same time slot (in a TDM system), provided that the communication units may be resolved by the adaptive array of antenna elements in the base station equipment 28. Alternatively, the narrowbeam BCCHs 51–53 may be on separate frequencies or different channel resources. Although cell 18 is shown to contain only three communication units, it will of course be appreciated that the cell may contain many more communication units that are simply not visible to the communication system at a given time, or do not require service. For the sake of brevity and to maintain the clarity of both FIG. 1 and the description, beamformed TCHs are not illustrated. The call establishment procedure for a beamformed BCCH is described subsequently.

Generally, base station equipment 26–38 within the cells is interconnected via at least one Operations and Maintenance Centre (OMC) 54–56 that is responsible for maintaining overall system control (such as by administering handoffs, routing calls and resolving any signalling contentions that may arise). The interconnection of base station equipment and OMCs is typically achieved with a high capacity (high bandwidth) link, such as a Megastream or E1 link 58 provided by fibre optic cable or a coax.

Figure 2A:
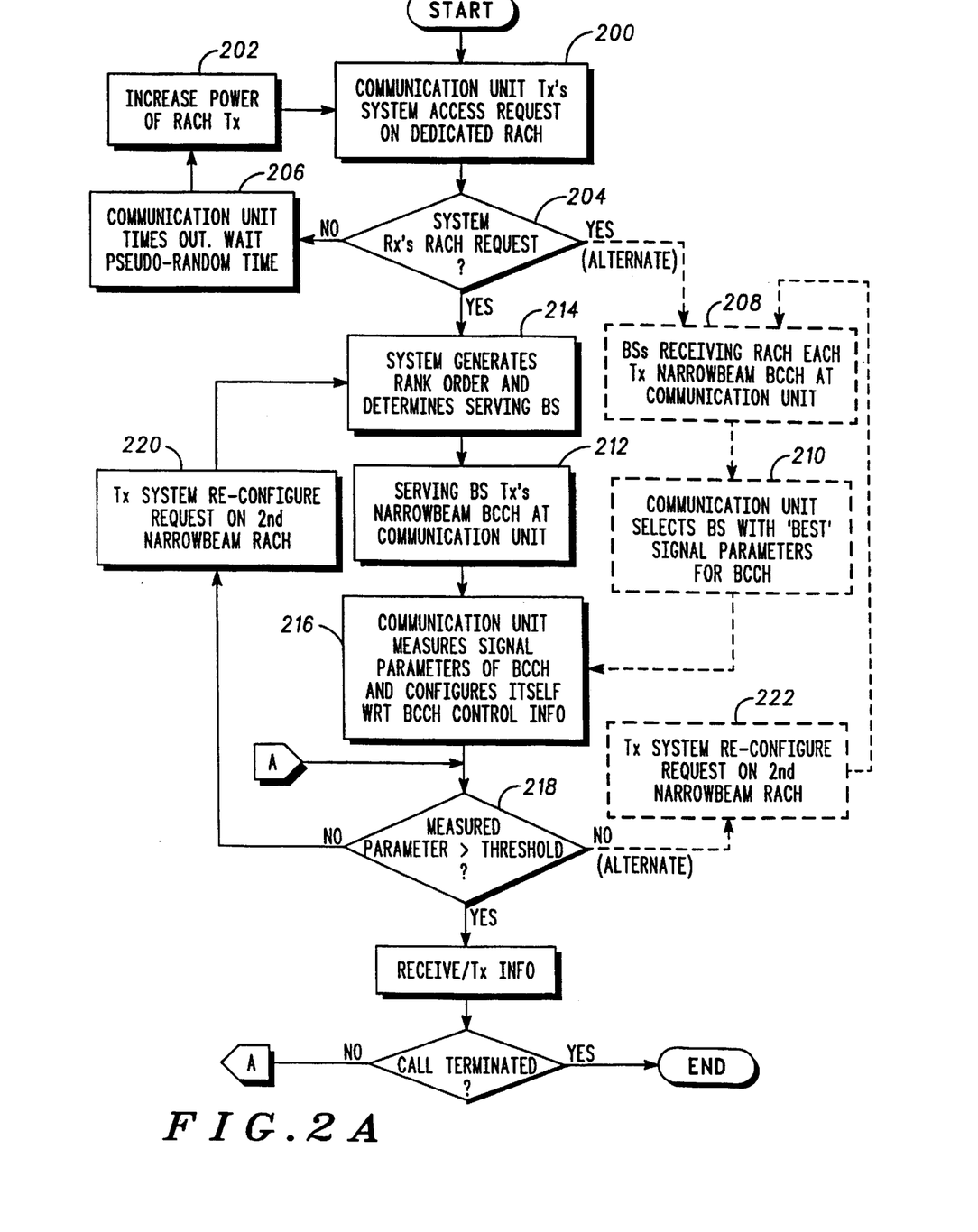
FIGS. 2a are 2b are flow diagrams illustrating, respectively, a call establishment algorithm and a system control sub-routine (according to a preferred embodiments of the present invention) for the communication system of FIG. 1.
Figure 2B:
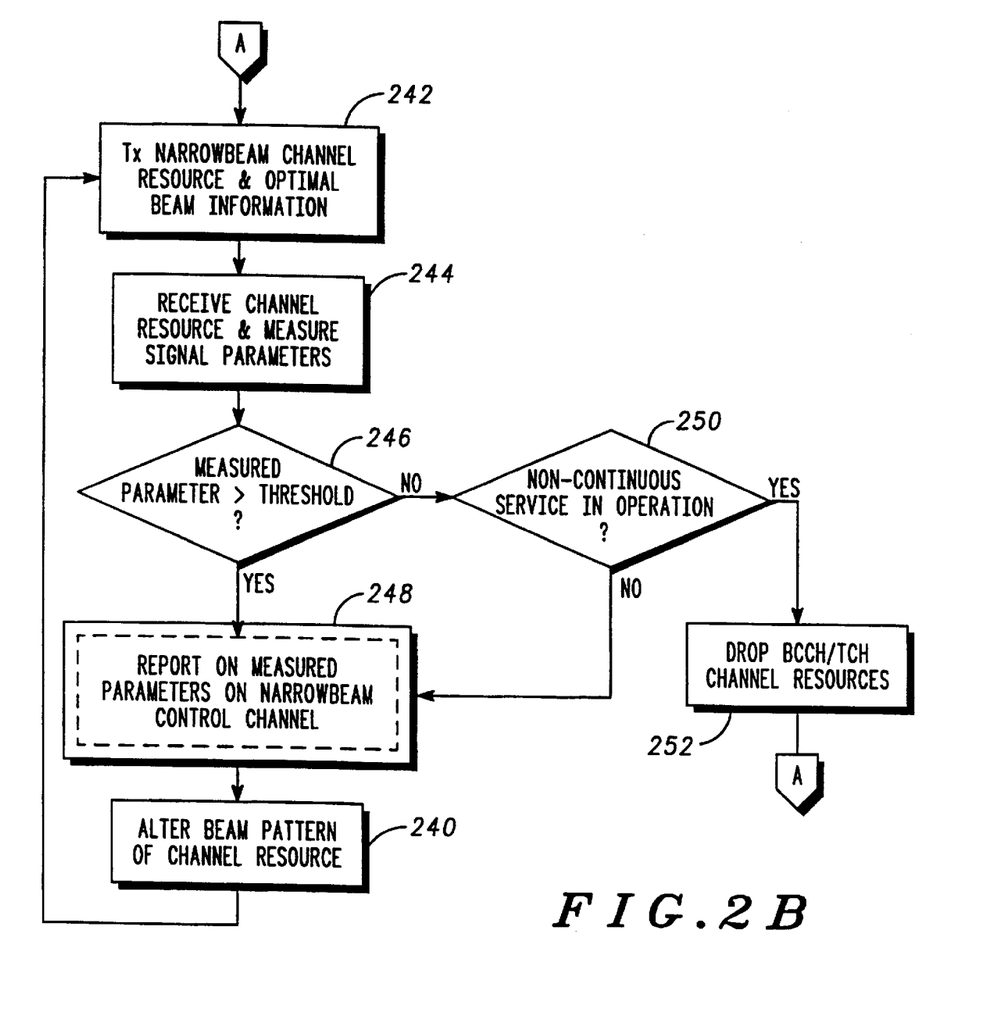

A system operating mechanism of a preferred embodiment of the present invention operates as follows, with reference to the flow diagrams of FIGS. 2a and 2b. With respect to the functional blocks of the flow diagrams, blocks shown in dotted out-lines represent optional or alternate features, as will be appreciated.

Upon powering-up (or when transitioning a coverage area boundary), a communication unit transmits 200 a request for access/service on a wide-area RACH having a dedicated frequency within the communication stem 10. Typically, the request for access/service will be a power level sufficient to ensure that it is received at a base station, although it is contemplated that this power level could be progressively incremented 202 from a predetermined minimum level if an initial attempt at low power fails to initiate a response 204 from the base station equipment. If nothing is received by the communication unit on a BCCH, the communication unit waits for a pseudo-random time 206 before re-sending (potentially at an elevated power level) the request for access/service on the wide-area RACH. The insertion of the pseudo-random time in the access sequence therefore ensures that simultaneous attempts on the wide-area RACH to gain access/service to the system by competing communication units can be resolved (since the base station equipment is arranged to time-out in the event that non-resolvable contentions arise).

In the event that the RACH is received, the communication system 10 broadcasts at least one narrowbeam BCCH in a direction of the requesting communication unit. Specifically, any base station equipment that receives the request of the wide-area RACH broadcasts a beamformed BCCH in the direction of the communication device 208 (based on a directional of arrival of the wide-area REACH at the array of antenna elements of the base station equipment), with the communication unit left to select 210 the base station equipment having the strongest BCCH as its serving site. Alternatively, the communication system (typically through a high level OMC operation) instructs the base station equipment of a particular cell 212 (e.g. the base site equipment that records the best signal parameter measurement for the wide-area RACH 214) to respond with a narrowbeam BCCH. Thereafter, the narrowbeam BCCH is used to impart control information (such as traffic channel allocations) in the usual way, known to the skilled addressee.

Clearly, after a communication resource (BCCH and/or TCH) has been established with the mobile unit, all up-link communications from the mobile unit may also be beamformed in response to the down-link to limit interference. The beamformed up-link may, however, have a marginally larger radiation footprint relative to the down-link to ensure that communication is maintained with the base station equipment, although this mechanism is principally applicable to mobile units rather than fixed site terminals since it takes into account movement of the mobile unit between transmissions.

Cells that support no on-going communications (either data or voice) are therefore devoid of a BCCH and thus do not contribute to overall system interference, and cells that have on-going communications have an interference limited BCCH environment arising from the directional nature and limited power profiles of beamformed radiation patterns generated for individual BCCHs by each adaptive array of antenna elements.

In the event that the communication unit receiving the narrowbeam BCCH is a mobile unit, such as a radiotelephone, there may be a periodic necessity to adjust beamforming weights for the narrowbeam (downlink) BCCH to ensure that the radiation pattern of the channel is optimised (i.e. substantially centralised) with respect to a position for the mobile unit. The present invention achieves this in one of three ways. Since the mobile unit is moving, measured sign parameters 216, such as received signal strength and bit error rate (BER), for the BCCH vary. The mobile unit is therefore arranged to monitor such parameters, and to realise that, for example, an increase in a rate of change of a particular parameter (or an unexpectedly low threshold measurement) is indicative of the mobile unit moving away from the optimal position in the radiation pattern of the narrowbeam BCCH. Consequently, if the rate of change in the parameter is greater than a predetermined threshold (or the measured signal parameter is outside a defined region for a received signal strength profile, or the like) 218, the mobile unit attempts to access the RACH 220 and 222, and therefore to notify the serving base station equipment to re-formulate down-link weights for the BCCH and TCH to improve, generally, channel robustness. In this respect, the mobile unit typically transits a narrowbeam RACH both to reduce interference and to decrease access time (by potentially only having to contend with other mobile units positioned in the radiation pattern of the narrowbeam RACH).

In a complementary sense or as an alternative, the base station equipment may periodically vary/alter 240 a radiation pattern or direction of the BCCH by adjusting the beamforming coefficients utilised in a transmitter chain of the communication equipment (typically the base station equipment). For example, the narrowbeam BCCH may be oscillated about a supposed position of the mobile unit (determined by the direction of arrival of the RACH transmission from the mobile) such that the radiation pattern of the BCCH is occasionally offset to either side of the supposed position of the mobile communication unit, as illustrated in relation to communication unit 48 in cell 16 where radiation patterns shown in dotted outline indicate the alternative directional projection of the BCCH. Simultaneously with the oscillation of the BCCH, directional information pertaining to the directional offset may be sent 242 to the receiving communication unit on the narrowbeam BCCH, which information, after reception, may be correlated 244 in the communication unit; against a measured signal parameter 246. This correlation process therefore provides another mechanism for determining whether there has been a movement in the position of the communication unit since a variation of the measured signal parameter in relation to the changing orientation of the serving BCCH is indicative of movement of the communication unit. The communication unit provides a feedback mechanism 248 to the base station equipment by simply accessing and transmitting (on a narrowbeam RACH) information indicative of the effect on measured signal parameters caused by oscillation of the narrowbeam BCCH, or a result of the correlation process.

In a similar manner to the oscillation mechanism previously described, the narrowbeam BCCH may have its radiation pattern pulsed laterally to momentarily adjust the width of its radiation pattern (or "footprint"), as illustrated in cell 22 of FIG. 1. Provided that the communication unit receiving the narrowbeam BCCH is stationary, then variation of the narrowbeam BCCH has ostensibly no discernible effect to the measured signal parameter determined by the communication unit. However, if the communication unit is moving, then the measured signal parameter for a relatively narrow BCCH transmission will vary significantly with time and therefore indicates to the communication unit that a RACH transmission to the base station equipment is required in order that the down-link and BCCH can be optimised (by re-formulating weights) to the new position of the communication unit. Again, the BCCH may contain information relating to the pulsing of the BCCH, but this is less critical for this particular embodiment since the mobile unit can respond directly to signal strength or BER conditions. In the case of significant drop-off in the measured signal parameter, the footprint of the narrowbeam RACH may be increased in width to ensure reception by the base site equipment, and then subsequently narrowed when the narrowbeam BCCH is re-focused to the new position of the mobile unit In a third way (which again may be independent or complementary to the other mechanism previously discussed), the mobile unit has, by virtue of the initial RACH attempt, already communicated with the base station equipment and the base station equipment has responded using a narrowbeam BCCH. Therefore, subsequent transmission from the mobile unit can be monitored by the base station equipment communication to determine a direction of arrival of the transmitted information. The base station equipment is therefore able to re-formulate the weights for the narrowbeam (down-link) BCCH to compensate for any movement of the mobile unit.

The present invention also contemplates that, with movement of a mobile unit, the RACH need not always be re-transmitted. Specifically, provided that there is no on-going communication (i.e. no assigned traffic channel) and subject to the type of communication format the communication unit is configured too receive (e.g. e-mail and other dislocated services not requiring the continuous existence of a communication resource) 250 then movement can be made independent of the continuous reception of a narrowbeam BCCH. As such, a communication unit may move out of the footprint of a narrowbeam BCCH (as determined by the measured signal parameter or a rate of change of the measured signal parameter) and only re-establish contact with the communication system using a wide-area RACH when either: (i) a multi-mode communication device is re-configured to receive a different communication format (e.g. a voice call that requires the continuous existence of a communication resource); or (ii) a user of the communication device wishes to log onto the communication system. In the event that a mobile communication unit does decide to abandon RACH transmission and therefore to loose narrowbeam BCCH reception, the system of the present invention times out the narrowbeam BCCH (based upon lack of TCH activity with respect to the particular communication device) to eliminate interference and to increase system capacity 262.

In relation to a handover mechanism between cells (or sectors), the preferred embodiment of the present invention operates as follows; Provided that a measured signal parameter for a narrowbeam BCCH is above a predetermined minimum threshold, i.e. is at an acceptable level, then the serving narrowbeam BCCH may be considered sufficient to continue to support the communication. In the event that the measured signal parameter of the narrowbeam BCCH degrades significantly, then the mobile unit notifies, the serving base station equipment and that in turn instructs other base station equipment in nearest neighbour cells (typically orchestrated through, the OMC) that a handoff of the mobile unit is required. The other base station equipment determines appropriate time and channel resources for narrowbeam BCCH transmissions and notifies this information to the original base station equipment which in turn notifies the communication unit. The communication unit then tunes itself to the designated frequency at the designated time and makes signal parameter measurement of at least one new BCCH, and either responds to this BCCH with a narrowbeam RACH (on an associated up-link) to select the new base station equipment or instructs the original base station equipment of its findings. The original BCCH can therefore be dropped or maintained accordingly, subject to OMC determination (as will be appreciated). The new BCCHs transmitted as test signals from candidate base station equipment are also narrowbeam signals. Specifically, narrowbeam (test signal) transmissions are possible because the candidate base station equipment has access to a data base of information relating to the relative orientation and grid references of base station equipment generally, and the serving base station equipment imparts angular information (i.e. realised from direction of arrival information) relating to the mobile unit. Consequently, by using the relative orientation, grid references and angular information, the candidate base station equipment is able to form a narrowbeam BCCH in the direction of the mobile unit requiring handoff.

Furthermore, although the system of the present invention operates with narrowbeam BCCHs and TCHs (and hence communication units may not necessarily have continuous access to control or traffic channels), mobile units in a fixed frequency scheme are preferably arranged to listen to surrounding frequencies, when available, and associated signal parameters (of either BCCHs or TCHs) by means or a frequency scanning receiver to determine whether the location of the mobile unit has changed significantly and therefore whether a handover of required. In this way, an unrecognised frequency is indicative of a location change and hence indicates the requirement for a RACH transmission to re-establish contact with the communication system.

Figure 3:
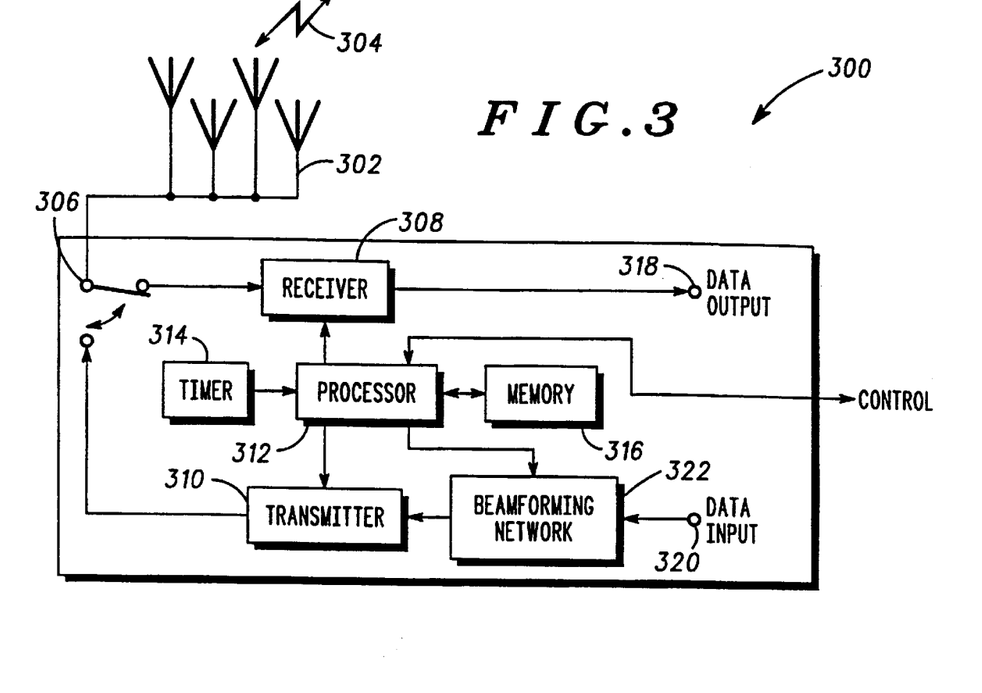
FIG. 3 is a block diagram of a base station according to a preferred embodiment of the present invention for use in the communication system of FIG. 1.

Turning to FIG. 3, there is shown a block diagram of a base station 300 according to a preferred embodiment of the present invention for use in the communication system of FIG. 1. The base station 300 comprises an array of antenna elements 302 for transmitting and receiving radio frequency (RF) signals 304. The array of antenna elements 302 provides the ability to generate a radiation pattern having a narrowbeam radiation pattern, defined by weighting coefficients typically calculated within the base station 300. The array of antenna elements 302 is coupled to a switch or circulator 306 that selectively couples signals to receiver circuitry 308 or transmitter circuitry 310. It will however be appreciated that the base station may be a full duplex device where simultaneous transmission and reception is possible. The receiver circuitry and transmitter circuitry are both controlled by a control processor 312 that is coupled to a system clock/timer 314 arranged to provide synchronisation and time-out indications for active calls. The control processor 312 is coupled to a memory 316 that stores operating routines and data for use by the control processor 312. The receiver circuitry 308 provides processed information to a data output 318. The control processor 312 is also arranged to determine a direction of arrival of a signal 304 received by the array of antenna elements 302, typically by use of the so-called 'MUSIC' algorithm that estimates an angle of reception (incidence) based on Eigen-value deposition of a received signal, as will be understood by the skilled addressee. A data input 320 receives information to be transmitted from the array of antenna elements 302, via a beamforming network 322 (responsive to the control processor 312) and the transmitter circuitry 310. The beamforming network 322 applies weighting coefficients to signals to generate the narrowbeam radiation pattern for transmission on a downlink channel resource that emanates from the array of antenna elements 302, as will be understood.

Figure 4:
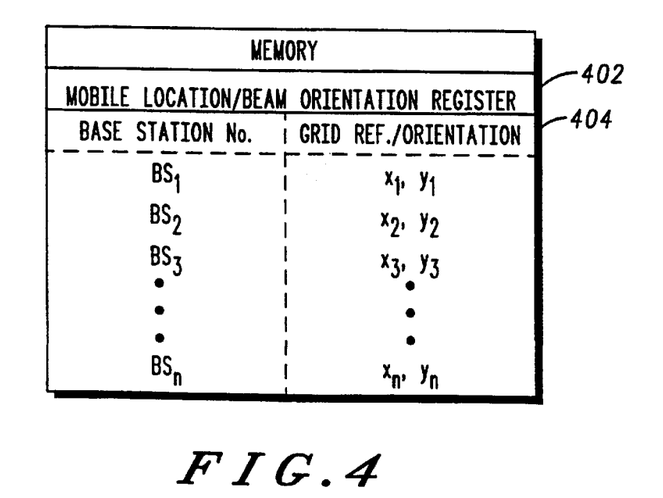
FIG. 4 illustrates a block of memory used in the base station of FIG. 3.

FIG. 4 illustrates a block of memory used in the base station of FIG. 3. The memory (which may be memory 316 of FIG. 3), contains a mobile location/beam orientation register 402 that stores an indication of a position of a communication unit (actively involved in a communication or registered with, the base station) relative to the base station (as interpreted, for example, by the aforementioned MUSIC algorithm), together with a base station position index 404 that relates base station identities with corresponding grid reference information. Typically, the grid reference will be in Cartesian form and will also include an indication concerning a relative orientation of the antenna array of each base station (for use in performing a narrowbeam handoff as previously described).

Figure 5:
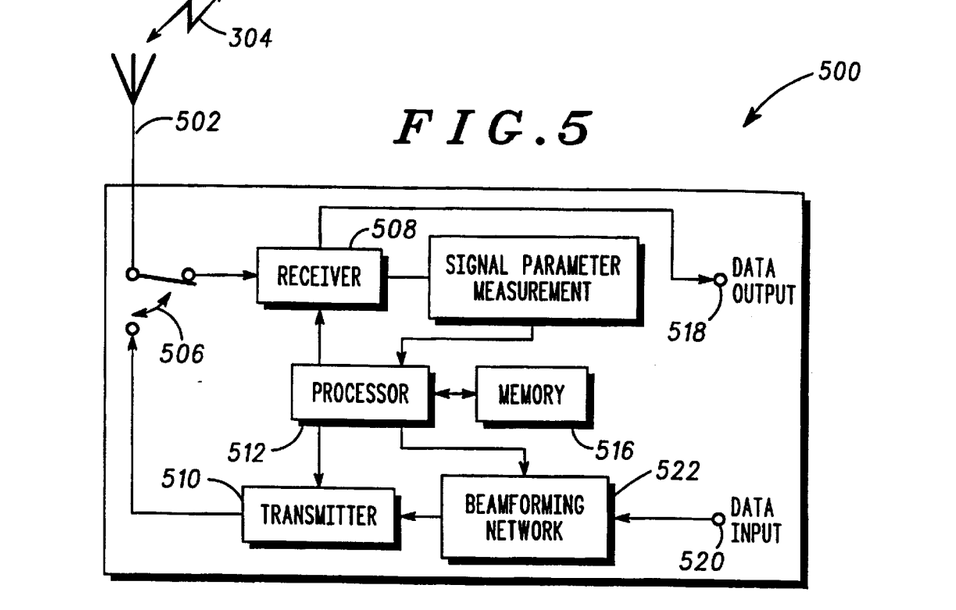
FIG. 5 is a block diagram of a mobile communication unit according to a preferred embodiment of the present invention for use with the base station of FIG.3.

FIG. 5 is a block diagram of a mobile communication unit 500 according to a preferred embodiment of the present invention for use with the base station 300 of FIG. 3. The mobile communication unit 500 comprises an antenna 502 for transmitting and receiving RF signals 304. The antenna 502 is capable of generating a narrowbeam radiation pattern, defined by weighting coefficients The antenna 502 is coupled to a switch or circulator 506 that selectively couples signals to receiver circuitry 508 or transmitter circuitry 510. It win however be appreciated that the mobile communication unit 500 may be a full duplex device where simultaneous transmission and reception is possible. The receiver circuitry 508 and transmitter circuitry 510 are both controlled by a control processor 512 that is coupled to a memory 516 for storing both operating routines, such as those required to calculate a rate of change of a measured signal parameter, and data for use by the control processor 512. The receiver circuitry 308 provides processed information to a data output 518, and to signal parameter measurement circuitry 519 that is also coupled to the control processor 512. A data input 520 couples information to be transmitted from the antenna 502 via a beamforming network 522 (responsive to the control processor 512) and the transmitter circuitry 510. The beamforming network 522 applies weighting coefficient to signals to generate the narrowbeam radiation pattern for transmission on an up-link channel resource that emanates from the antenna 502, as will be understood.

Figure 6:
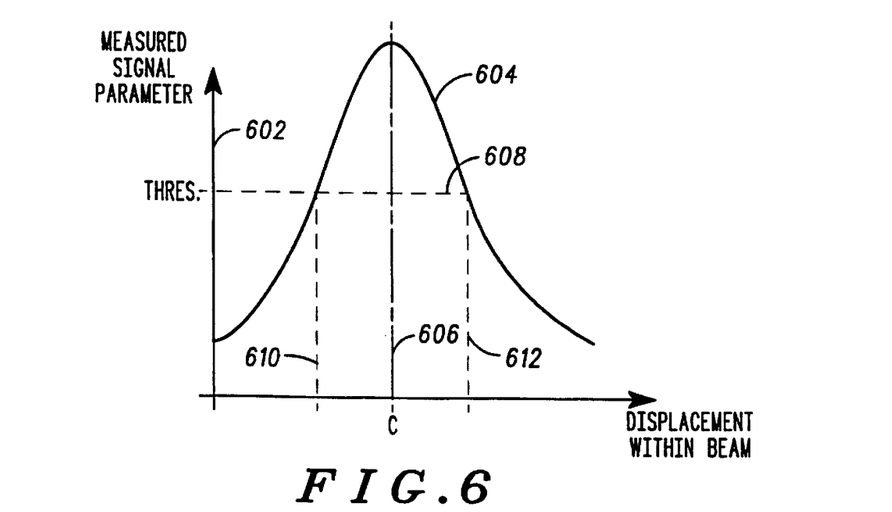
FIG. 6 is a graphical representation indicative of a variation in a measured signal parameter against a displacement within a narrowbeam radiation pattern, and an indication of how a decision making process is invoked by a preferred embodiment of the present invention to support communication between the mobile unit of FIG. 5 and the base station of FIG. 3.

FIG. 6 illustrates a graphical representation indicative of a variation in a measured signal parameter against a displacement within a narrowbeam radiation pattern, and an indication of how a decision making process is invoked by a preferred embodiment of the present invention to support communication between the mobile unit of FIG. 5 and the base station of FIG. 3. As can be seen, a measured signal parameter 602 (such as received sign strength or BER) has a profile 604 that is Gaussian in nature. When a mobile communication device is centrally located (as marked on the abscissa at 606) with respect to a down-link narrowbeam radiation pattern, the measured signal parameter is at a maximum. However, as the mobile unit moves away from the centre of the narrowbeam radiation pattern, the measured signal parameter drops off in an exponential fashion, and at a measured signal parameter threshold of 608 (on shown on the ordinate axis) is deemed insufficient to support continued communication on a presently serving BCCH. In other words, the threshold 608 corresponds to a displacement from the centre of the narrowbeam radiation pattern, as illustrated by the acceptable extremities of the profile 610 and 612. The profile is stored in memory 516 of FIG. 5.

Figure 7:
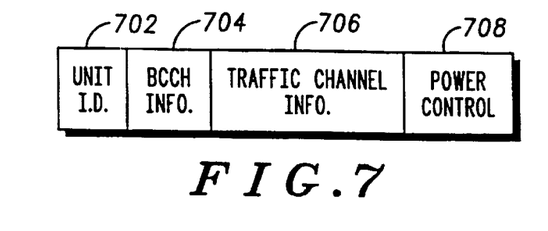
FIGS. 7 and 8 illustrate how a feedback mechanism is provided within a signalling protocol of the present invention.
Figure 8:
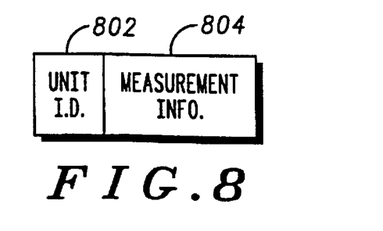

FIGS. 7 and 8 illustrate how a feedback mechanism is provided within a signalling protocol of the present invention. Specifically, in the event that the base station equipment oscillates or otherwise varies the narrowbeam radiation (beam) pattern, a control message 700 on a transmitted BCCH contains: a) unit ID information 702 identifying a communication unit to which the BCCH is addressed; b) BCCH information 704 identifying how exactly the BCCH has been varied; c) traffic channel information pertinent to an on-going communication, as will be readily appreciated; and d) power control information that is subsequently used by the mobile unit for power control. In response to this down-link information, the mobile unit responds (typically on the narrowbeam RACH) with a signalling scheme 800 that includes its unit ID 802 and measurement information 804 that reports on recorded fluctuations in measured signal parameters (as correlated against the received BCCH information 704). In this way, the measurement information 804 assists in system control by reporting the effects of either the deliberate BCCH variation or the general quality of the narrowbeam BCCH, as experienced by the communication unit. The control processor of the base station equipment is therefore able to correct for movement of the mobile unit based upon these reported fluctuations and directional of arrival information.

Although preferred features of the present invention implement a feedback reporting structure with respect to the maintenance of a narrowbeam control channel, it will be appreciated that the concept of providing a feedback mechanism is equally applicable to other forms of narrowbeam communication resources. Particularly, the general concepts of the present invention can be applied to the implementation of a feedback mechanism with respect to a narrowbeam traffic channel, and is particularly valuable in relation to a traffic channel that has its radiation pattern varied. Specifically, the feedback mechanism for such a traffic channel, for example, can be used to indicate whether: i) the reception quality of a received (beamformed) traffic channel is sufficient; ii) the quality of a serving traffic channel has degraded enough to warrant handoff; or iii) the quality of a serving traffic channel has degraded marginally to indicate that re-aligned of the narrowbeam radiation pattern is warranted. In this way, oscillation of the radiation pattern of the traffic channel (or the pulsing of the width of the narrowbeam traffic channel, for example) from either the base station or the communication unit can be used to provide information for subsequent use in beamforming of the traffic channel. Again, the feedback may take the form of a report on BER or received signal strength information, or can be more complex (e.g. containing correlation information) and detailed in nature, as will be understood. Indeed, it; is also contemplated that a beamformed channel directed from one unit to another can be analysed (in terms of a measurable signal parameter) at the receiving unit, whereafter the receiving unit provides feedback to the transmitting unit with regard to the measured signal parameter. A general logical flow for this alternative process can be seen by viewing FIG. 2b in a generic sense, and this figure should not therefore be construed as limiting with respect to defining solely a BCCH control algorithm.

The present invention therefore advantageously provides a communication system having reduced interference.

What is claimed is:

1. A method of establishing radio communication between a communication unit and a base station having an array of antenna elements, the method comprising the steps of:

receiving a system access request at each base station of a plurality of base stations, wherein each base station of the plurality of base stations comprises an antenna array;

making signal parameter measurements of the access request received by each base station of the plurality of base stations;

determining a rank order of signal parameter measurements with respect to the plurality of base stations;

selecting a base station to serve the communication unit based on the rank order to produce a serving base station;

at the serving base station, in response to the received system access request, forming a first narrowbeam control channel to the communication unit and transmitting system control information to the communication unit on the first narrowbeam control channel, the system control information transmitted from the array of antenna elements and arranged to identify a narrowbeam communication resource for use in the radio communication;

at the serving base station, receiving a request for assignment of a new narrowbeam control channel;

in response to the request for assignment of a new narrowbeam control channel, instructing at least one non-serving base station of the plurality of base stations to prepare to transmit narrowbeam control channels at the communication unit;

at the at least one non-serving base station of the plurality of base stations, in response to receiving an instruction to prepare to transmit, notifying the serving base station of channel assignment information pertaining to a subsequent transmission of the narrowbeam control channels at the communication unit; and at the serving base station, in response to receiving the channel assignment information from the at least one non-serving base station, notifying the communication unit of the channel assignment information on the first narrowbeam control channel.

2. The method of claim 1, further comprising the step of, at the serving base station, periodically altering a beam pattern of the first narrowbeam control channel.

3. The method of claim 2, wherein the beam pattern of the first narrowbeam control channel is oscillated about an expected position of the communication unit.

4. The method of claim 2, wherein a width of the beam pattern of the first narrowbeam control channel is pulsed.

5. The method of claim 2, further comprising the step of, at the serving base station, transmitting beam pattern information on the first narrowbeam control channel identifying how the beam pattern of the first narrowbeam control channel is altering.

6. The method of claim 1, further comprising the steps of:

determining a base station handoff candidate from among the at least one non-serving base stations; and receiving, by the base station handoff candidate and via a narrowbeam control channel associated with the base station handoff candidate, a signal to initiate handoff of the radio communication.

7. The method of claim 1, further comprising the steps of:

storing base station location information and communication unit location information; and by each base station of the plurality of base stations, accessing the base station location information and the communication unit location information to beamform, during handoff of the radio communication, a narrowbeam control channel in a direction of the communication unit.

8. A radio communication system for supporting radio communication between a communication unit and at least one of a plurality of base stations, the system comprising:

a plurality of base stations, wherein each base station of the plurality of base stations comprises:

an array of antenna elements;

a means, responsive to the array of antenna elements, for receiving and processing a system access request;

a means, responsive to the system access request, for assigning and generating system control information identifying a narrowbeam communication resource for use in a radio communication with the communication unit;

a means, coupled to the array of antenna elements, for forming and transmitting a first narrowbeam control channel to the communication unit in response to the received system access request;

a means for making signal parameter measurements of the access request received at each base station of the plurality of base stations;

a means for determining a rank order of signal parameter measurements with respect to the plurality of base stations;

a means for selecting a serving base station to serve the communication unit from the rank order;

a means at the serving base station for receiving a request for assignment of a new narrowbeam control channel;

a means for instructing, in response to the request for assignment of a new narrowbeam control channel, at least one non-serving base station of the plurality of base stations to prepare to transmit narrowbeam control channels at the communication unit;

a means at the at least one non-serving base station of the plurality of base stations for notifying, in response to receiving an instruction to prepare to transmit, the serving base station of channel assignment information pertaining to a subsequent transmission of the narrowbeam control channels at the communication unit; and a means at the serving base station for notifying, in response to receiving the channel assignment information from the at least one non-serving base station, the communication unit of the channel assignment information on the first narrowbeam control channel.

19. The communication system of claim 8, wherein the serving base station further comprises means for periodically altering a beam pattern of the first narrowbeam control channel.

* * * * *

UNITED STATES PATENT AND TRADEMARK OFFICE
CERTIFICATE OF CORRECTION

PATENT NO. : 6,330,459 B1  Page 1 of 1
DATED : December 11, 2001
INVENTOR(S) : Crichton et al.

It is certified that error appears in the above-identified patent and that said Letters Patent is hereby corrected as shown below:

Column 14,
Line 3, claim number 19, should be -- 9 --.

Signed and Sealed this

Twenty-fifth Day of June, 2002

Attest:

JAMES E. ROGAN
Attesting Officer     Director of the United States Patent and Trademark Office